(12) United States Patent  
Bondhugula et al.

(10) Patent No.: US 8,584,103 B2  
(45) Date of Patent: Nov. 12, 2013

(54) REDUCING PARALLELISM OF COMPUTER SOURCE CODE

(75) Inventors: Uday Kumar Bondhugula, White Plains, NY (US); Alexandre E. Eichenberger, Chappaqua, NY (US); John Kevin P. O'Brien, South Salem, NY (US); Lakshminarayanan Renganarayana, Elmsford, NY (US); Yuan Zhao, Ossining, NY (US)

(73) Assignee: International Business Machines Corporation, Armonk, NY (US)

( * ) Notice: Subject to any disclaimer, the term of this patent is extended or adjusted under 35 U.S.C. 154(b) by 818 days.

(21) Appl. No.: 12/817,999

(22) Filed: Jun. 17, 2010

(65) Prior Publication Data

US 2011/0314442 A1   Dec. 22, 2011

(51) Int. Cl.
*G06F 9/44* (2006.01)
*G06F 9/45* (2006.01)
*G06F 9/46* (2006.01)

(52) U.S. Cl.
USPC .......................... 717/136; 717/106; 718/102

(58) Field of Classification Search
None
See application file for complete search history.

(56) References Cited

U.S. PATENT DOCUMENTS

| | | | |
|---|---|---|---|
| 7,386,864 B2 * | 6/2008 | Richardson | 719/321 |
| 7,886,283 B2 * | 2/2011 | Nacul et al. | 717/137 |
| 2001/0020293 A1 * | 9/2001 | Uchihira et al. | 717/4 |
| 2004/0153803 A1 * | 8/2004 | Makida et al. | 714/30 |
| 2008/0263530 A1 | 10/2008 | Rahavan et al. | |
| 2008/0294882 A1 | 11/2008 | Jayapala et al. | |
| 2009/0083724 A1 | 3/2009 | Eichenberger et al. | |
| 2009/0259997 A1 | 10/2009 | Grover et al. | |
| 2012/0254875 A1 * | 10/2012 | Marathe et al. | 718/102 |

FOREIGN PATENT DOCUMENTS

| CN | 101477472 A | 7/2009 |
|---|---|---|
| WO | WO9908187 A1 | 2/1999 |

OTHER PUBLICATIONS

"Automatic Transformations for Communication-Minimized Parallelization and Locality Optimization in the Polyhedral Model" by Uday Bondhugula, Apr. 3, 2008, 15 pages[online][retrieved on Feb. 26, 2013]. Retrieved from <http://drona.csa.iisc.ernet.in/~uday/publications/uday-cc08.pdf>.*
Shashidhar et al., "Automatic Functional Verification of Memory Oriented Global Source Code Transformations", IEEE 2003, pp. 31-35.
Bondhugula et al., "Towards Effective Automatic Parallelization for Multicore Systems", IEEE 2008.
Trifunovic et al., "Polyhedral-Model Guided Loop-Nest Auto-Vectorization", IEEE Computer Society 2009, pp. 327-337.
Pouchet et al., "Iterative Optimization in the Polyhedral Model: Part I, One-Dimensional Time", IEEE 2007.
Bastoul, "Code Generation in the Polyhedral Model Is Easier than You Think", IEEE (PACT'04).

* cited by examiner

*Primary Examiner* — Li B Zhen
*Assistant Examiner* — Evral Bodden
(74) *Attorney, Agent, or Firm* — Ido Tuchman; William J. Stock

(57) ABSTRACT

An example embodiment disclosed is a method for reducing parallelism of computer source code. The method includes receiving multi-threaded program source code and representing the multi-threaded program source code as a polyhedral framework stored in computer readable memory. The polyhedral framework is used to convert the polyhedral framework from the multi-threaded program source code representation to a single-threaded program source code representation.

21 Claims, 16 Drawing Sheets

```
__kernel void e1(
    __global float *a,
    __local float *b)
{
 int gid = get_global_id(0);
 for(t = 0; t < timeSteps; t++) {
   b[gid] = (a[gid-1] + a[gid+1]) / 2;
   barrier();
   a[gid] = b[gid];
   barrier();
 }
}
```

*Fig. 4A*

```
__kernel void e1(__global float *a,
         __local float *b)
{
  int numWorkItems = get_local_size(0);
  for(int WI = 0; WI < numWorkItems; WI++) {
    gid[WI] = get_global_id(0) + WI;
  }
  for(t = 0; t < timeSteps; t++) {
    for(int WI = 0; WI < numWorkItems; WI++) {
      b[gid[WI]] = (a[gid[WI]-1] + a[gid[WI]+1]) / 2;
    }
    // barrier();
    for(int WI = 0; WI < numWorkItems; WI++) {
      a[gid[WI]] = b[gid[WI]];
    }
    // barrier();
  }
}
```

*Fig. 4B*

```
__kernel
__attribute__((reqd_work_group_size(4,1,1)))
void e2(__global float *a, __local float *b)
{
  int gid = get_global_id(0);              // S0, {0}
  int lid  = get_local_id(0);              // S1, {1}
  b[gid] = (a[gid-1] + a[gid+1]) / 2 + lid; // S2, {2}
  barrier();                               // S3, {3}
  a[gid] = b[gid];                         // S4, {4}
  barrier();                               // S5, {5}
  for(t = 0; t < timeSteps; t++) {
    b[gid] = (a[gid-1] + a[gid+1]) / 2;    // S6, {6, 0}
    barrier();                             // S7, {6, 1}
    a[gid] = b[gid];                       // S8, {6, 2}
    barrier();                             // S9, {6, 3}
  }
}
```

*Fig. 6*

```
Function InsertWorkItemLoops()
// numDims: work-item dimensions
Begin
  for d = 0 to numDims
    for s = 1 to numStatements
      PT_Extend(s)
    endfor
    if(d == 0)
      for s = 1 to numStatements-1
        PT_Fusion(0, s)
      endfor
    endif
    for s = 0 to numStatements-1
      PT_CutDom(s, loop bounds)
    endfor
  endfor
End
```

*Fig. 7*

```
__kernel
__attribute__((reqd_work_group_size(4,1,1)))
void e2(__global float *a, __local float *b)
{
  for(t1 = 0; t1 <= 3; t1++) {
    gid = get_global_id(0);                  // S0, {0, 0}
    lid = get_local_id(0);                   // S1, {0, 1}
    b[gid] = (a[gid-1] + a[gid+1]) / 2 + lid; // S2, {0, 2}
    barrier();                               // S3, {0, 3}
    a[gid] = b[gid];                         // S4, {0, 4}
    barrier();                               // S5, {0, 5}
    for(t = 0; t < timeSteps; t++) {
      b[gid] = (a[gid-1] + a[gid+1]) / 2;    // S6, {0, 6, 0}
      barrier();                             // S7, {0, 6, 1}
      a[gid] = b[gid];                       // S8, {0, 6, 2}
      barrier();                             // S9, {0, 6, 3}
    }
  }
}
```

*Fig. 8*

```
Function DistributeMain(Node root)
// numDims: work-item dimensions
// root: Beta-prefix tree in child-sibling format
Begin
  Node t = root
  for i = 0 to numDims
    t = t->child
  endfor
  Distribute(t, numDims)
End Function int Distribute(Node n, int depth)
// numDims: work-item dimensions
// n: is the current node
// depth: depth of current loop level
Begin
  while n is not NULL
    if n is dotted oval node   // contains sync
      PT_Distribute(n, depth)
      if n is leaf   // sync itself
        PT_CutDom(n, 1 iteration of work-item loops)
      else          // a loop contains sync
        for all children cn of n
          PT_Interchange(cn, depth, outer numDims)
        Distribute(n->child, depth+1)
      endif
    endif
    n = n->sibling    // next child of n's parent
  endwhile
End
```

*Fig. 10*

```
for(t1 = 0; t1 <= 3; t1++) {
    gid = get_global_id(0);                  // S0, {0,0}
    lid = get_local_id(0);                   // S1, {0,1}
    b[gid] = (a[gid-1] + a[gid+1]) / 2 + lid; // S2, {0,2}
}
for(t2 = 0; t2 <= 0; t2++)
    barrier();                               // S3, {1,0}
for(t3 = 0; t3 <= 3; t3++)
    a[gid] = b[gid];                         // S4, {2,0}
for(t4 = 0; t4 <= 0; t4++)
    barrier();                               // S5, {3,0}
for(t = 0; t < timeSteps; t++) {
    for(t5 = 0; t5 <= 3; t5++)
        b[gid] = (a[gid-1] + a[gid+1]) / 2;  // S6, {4,0,0}
    for(t6 = 0; t6 <= 0; t6++)
        barrier();                           // S7, {4,1,0}
    for(t7 = 0; t7 <= 3; t7++)
        a[gid] = b[gid];                     // S8, {4,2,0}
    for(t8 = 0; t8 <= 0; t8++)
        barrier();                           // S9, {4,3,0}
}
```

*Fig. 12*

```
for(t1 = 0; t1 <= 3; t1++) {
        gid[t1] = get_global_id(0) + t1;
        lid = t1;
        b[gid[t1]] = (a[gid[t1]-1] + a[gid[t1]+1]) / 2
                + lid;
}
// barrier();
for(t3 = 0; t3 <= 3; t3++)
        a[gid[t3]] = b[gid[t3]];
// barrier();
for(t = 0; t < timeSteps; t++) {
        for(t5 = 0; t5 <= 3; t5++)
                b[gid[t5]] = (a[gid[t5]-1] + a[gid[t5]+1]) / 2;
        // barrier();
        for(t7 = 0; t7 <= 3; t7++)
                a[gid[t7]] = b[gid[t7]];
        // barrier();
}
```

*Fig. 14*

REDUCING PARALLELISM OF COMPUTER SOURCE CODE

BACKGROUND

The present invention relates generally to improving execution performance of computer programs. More specifically, the present invention relates to converting an implicitly multi-threaded program source code of work-items to an explicitly single-threaded program source code of a work-group for use in, for example, a thread-poor computing environment. In one embodiment of the invention, the computer programs are written in Open Computing Language (OpenCL).

There is a natural mapping of the OpenCL computing units onto the graphical processing units (GPUs). A work-group is mapped onto a thread block on GPU, and the work-items are mapped to the threads within the thread block. There is also hardware support for fast scheduling and synchronizing threads within the thread block.

However, on other accelerators that do not have abundant number of hardware threads and fast threads switching mechanism, mapping work-group with multiple work-items is not straight-forward. Examples of such systems are CELL Broadband Engine and multi-core CPUs. CELL SPE can only run one hardware thread at a time, which each core in today's multi-core CPUs can run 2 to 8 SMT threads. To run OpenCL program on such accelerators, a programmer typically has to either limit the number of work-items in each work-group, or an OpenCL implementation has to provide support for accommodating multiple work-items.

One way of supporting multiple work-items of a work-group in a thread-poor environment is to implement a virtual threading mechanism. In such a mechanism, each work-item is mapped to a virtual thread that can be mapped to a hardware thread and virtual threads take turns to be scheduled and executed. However, this mechanism incurs a significant overhead in thread switching for architectures with abundant registers such as CELL SPE, since it relies on either traditional thread switching mechanism in the operating system or the corresponding software emulation, especially when compared to the fast thread switching support in GPU hardware.

SUMMARY

An example embodiment of the present invention is a method for reducing parallelism of computer source code. The method includes receiving multi-threaded program source code and representing the multi-threaded program source code as a polyhedral framework stored in computer readable memory. Next, transformations are applied to the polyhedral framework to convert the polyhedral framework from the multi-threaded program source code representation to a single-threaded program source code representation. A single-threaded program source code is automatically generated from the polyhedral framework.

Another example embodiment of the present invention is a system for reducing parallelism of computer source code. The system includes computer readable memory and a computer processor coupled to the computer readable memory. Furthermore, a multi-threaded program source code is stored in the computer readable memory. The computer processor is configured to represent the multi-threaded program source code as a polyhedral framework stored in the computer readable memory, apply transformations to the polyhedral framework to convert the polyhedral framework from the multi-threaded program source code representation to a single-threaded program source code representation, and automatically generate a single-threaded program source code using the polyhedral framework.

Yet a further example embodiment of the invention is a computer program product for reducing parallelism of computer source code. The computer program product includes computer readable program code configured to receive multi-threaded program source code, represent the multi-threaded program source code as a polyhedral framework stored in computer readable memory, apply transformations to the polyhedral framework using a computer processor to convert the polyhedral framework from the multi-threaded program source code representation to a single-threaded program source code representation, and automatically generate a single-threaded program source code using the polyhedral framework.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

FIGS. 4A and 4B show example transformations necessary for aggregation parallel work-item kernel function into a sequential work-group kernel function.

FIG. 6 shows an example multi-threaded source code listing.

FIG. 7 shows an example algorithm for inserting work-item loops.

FIG. 8 shows the resulting source code after inserting work-item loops to the source code listed in FIG. 6.

FIG. 10 shows an example algorithm for distributing work-item loops around synchronization statements so that synchronizations are only executed before or after work-item loops.

FIG. 12 shows the resulting source code after distributing work-item loops around synchronization statements to the source code listed in FIG. 8.

FIG. 14 shows the final source code listing in an example transformation after work-item aggregation is performed.

DETAILED DESCRIPTION

The present invention is described with reference to embodiments of the invention. Throughout the description of the invention reference is made to FIGS. 1-15.

Figure 1:
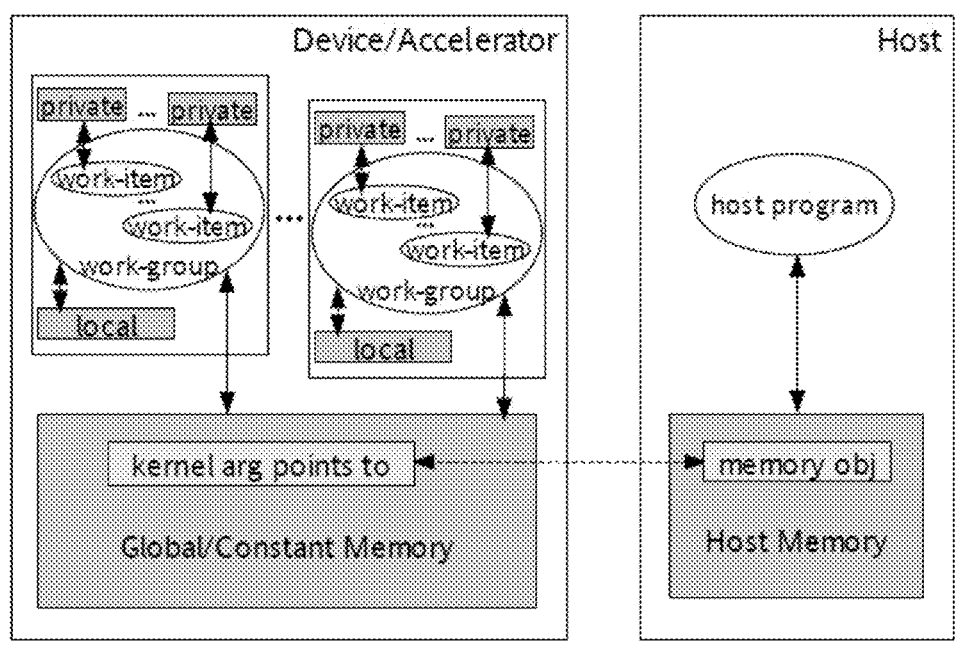
FIG. 1 illustrates an example conceptual memory model of OpenCL, as contemplated by the present invention.
Figure 2:
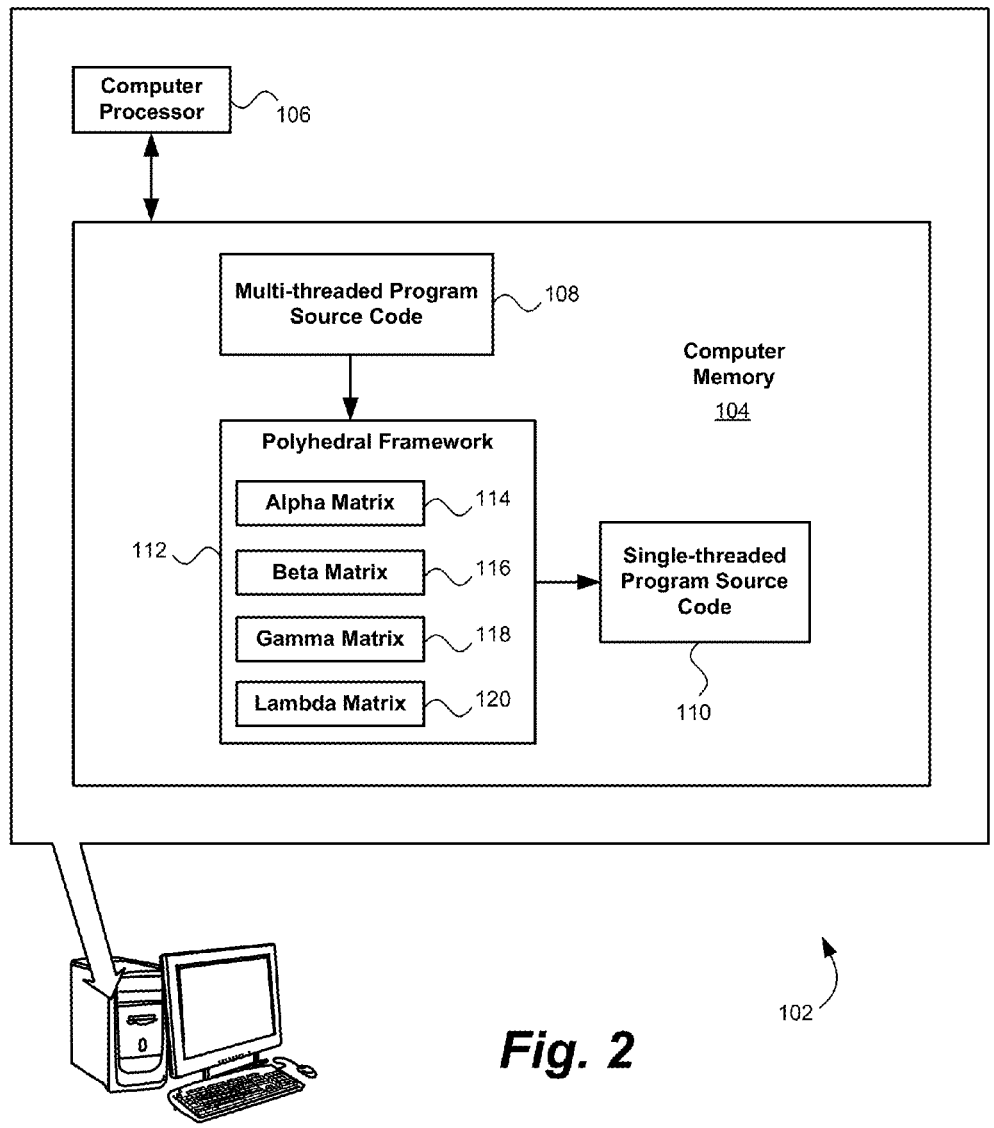
FIG. 2 shows an example system embodiment of the present invention.

With reference now to FIG. 2, an example system 102 to reduce parallelism of computer source code is shown. The system 102 may be a computer, such as a general purpose computer or a computer configured to perform specific operations. The system 102 includes computer readable memory 104 and a computer processor 106 coupled to the computer readable memory 104.

The computer readable memory 104 stores multi-threaded program source code 108. As discussed in detail below, the computer processor 106 is configured to convert the multi-threaded program source code 108 into single-threaded program source code 110 using a polyhedral framework 112. As used herein, a polyhedral framework employs a mathematical representation to represent and transform loops and other control flow structures.

By transforming the multi-threaded program source code 108 into the single-threaded program source code 110, several benefits may be achieved. First, the system 102 enables the portability of multi-threaded programs written for thread-optimized hardware, such as GPUs, to thread-poor environment, such as CELL and multi-core CPUs. A thread-poor environment refers to a system that does not have an abundant number of hardware threads. It usually refers to multi-core processors with a single thread or tens of threads. In contrast, modern graphics cards typically have thousands of threads.

Second, the system 102 helps eliminates the overhead of thread switching costs that would be incurred if a thread switching strategy were in place instead. Lastly, since user does not need to limit the number of work-items in a work-group, more data can be processed in each work-group and less work-groups need to be scheduled given the same problem size, thus the overall performance can be improved.

As discussed further below, the computer processor 106 is configured to represent the multi-threaded program source code 108 as a polyhedral framework 112 stored in the computer readable memory 104. The computer processor 106 applies program transformations to the polyhedral framework 112 to convert the polyhedral framework 112 from the multi-threaded program source code representation to a single-threaded program source code representation. Once the transformations are applied, the computer processor 106 automatically generate the single-threaded program source code 110 using the polyhedral framework 102.

The computer processor 106 may be configured to process the multi-threaded program source code 108 before applying the program transformations such that there is only one return statement in the multi-threaded program source code 108 and the return statement appears at the end of the multi-threaded program source code 108. This step helps ensure that maximum inline expansion has been performed before the program transformations are performed.

In one embodiment, the multi-threaded program source code 108 is a parallel kernel function for a single work-item written in OpenCL C language syntax, and the single-threaded program source code 110 is a sequential OpenCL kernel function for a whole work-group. Thus, the computer processor 106 aggregates all work-items in a work-group into one sequential program that can be executed by one thread.

The difficulties of such a transformation are the preservation of the semantics of synchronization of original parallel work-items program in the newly created sequential work-group program, the preservation of work-item built-in properties (e.g., global_id, local_id, etc.), and the privatization of data that are private to each work-item. Without synchronization, aggregation can be implemented straight-forwardly by wrapping original work-item kernel code with loops that enumerate all work-items in a work-group, and preserving the work-item built-in properties.

In one embodiment, the computer processor 106 is configured to wrap synchronized code blocks of the multi-threaded program source code 108 represented by the polyhedral framework 112 in iterative loops such that the synchronized code blocks are completed in the same number of iterations as the number of threads defined in the multi-threaded program source code. The computer processor 106, in applying program transformations to the polyhedral framework 112, may be further configured to extend a domain of statements in the polyhedral framework 112 by an additional dimension, fuse at least two statements in the multi-threaded program source code 108 into a single program loop that contains the fused statements, and indicate constraints to the fused statement's domain in the program loop's bounds. In one embodiment, the computer processor 106 is further configured to distribute program loops in the polyhedral framework 108 around synchronization statements in the multi-threaded program source code 108 so that the synchronization statements are only executed either before or after the program loops. In a particular configuration, a beta-prefix tree data structure of the polyhedral framework is generated. As discussed below, leaf nodes of the beta-prefix tree are statements in the polyhedral framework, and internal nodes of the beta-prefix tree are the loops in the polyhedral framework.

As discussed in detail below, the polyhedral framework 112 may include an alpha matrix 114, a beta matrix 116, a gamma matrix 118, and a lambda matrix 120. The alpha matrix 114 is used to identify program loops for statements in the multi-threaded program source code 108. The beta matrix 116 is used to identify a scheduling order of execution of the statements in the multi-threaded program source code. The gamma matrix 118 contains symbolic constants of the multi-threaded program source code. Finally, the lambda matrix 120 contains domain restrictions of the statements in the multi-threaded program source code.

The work units in an OpenCL program are arranged and partitioned in a three-dimensional range, where each partition is called a work-item. Each item is uniquely identified by a three-dimensional coordinate in the partitioned range, namely, global id, (g_x, g_y, g_z). Note that there could be a one-dimensional range or two-dimensional range, in which cases the sizes of the rest dimensions are simply degenerated to one.

Work-items can then be grouped into work-groups. Each work-group contains the same number of work-items in each dimension in the range. Assuming the total number of work-units is (G_x, G_y, G_z), the size of each work-group is (S_x, S_y, S_z), then the number of work-groups are (W_x, W_y, W_z)=(G_x/S_x, G_y/S_y, G_z/S_z).

Similar to a work-item, a work-group is also identified by a three-dimensional work-group id, (w_x, w_y, w_z). Each work-item also has a local id (s_x, s_y, s_z) relative only to its own work-group. The following equation gives the relationship between work-item global id, work-group id and work-group size that the work-item is in, and work-item local id:

$$(g\_x, g\_y, g\_z) = (w\_x*S\_x+s\_x, w\_y*S\_y+s\_y, w\_z*S\_z+s\_z)$$

Figure 3:
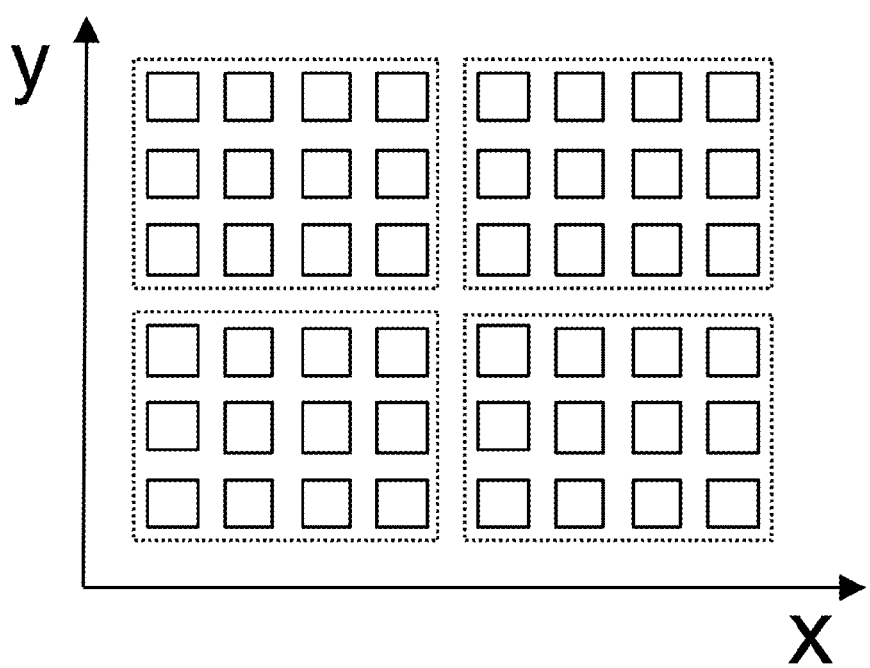
FIG. 3 shows an example of 2-dimensional NDRange decomposition of 48 work-items in an OpenCL program.

FIG. 3 shows an example of 2-dimensional NDRange decomposition of 48 work-items. The NDRange size is (8, 6, 1), it is divided into four work-groups and the work-group size is (4, 3, 1). Taking the top-right work-item as an example, its global id is (7, 5, 0), its local id is (3, 2, 0), and its group id is (1, 1, 0). OpenCL provides work-item built-in functions to query the above mentioned ids and sizes in each dimension.

Work-items within the same work-group can synchronize with each other. There are two kinds of synchronization functions in OpenCL, barrier( ) and wait_group_events( ). These synchronization functions are textually aligned. When one work-item reaches synchronization, it cannot proceed until all other work-items reach the same synchronization in the program. Moreover, if a synchronization is in a conditional statement, either all work-items reach the same synchronization during the execution or no work-item reaches it. If a synchronization is in a loop, all work-items must reach the same synchronization the same amount of times.

FIGS. 4A and 4B show example transformations necessary for aggregation parallel work-item kernel function (FIG. 4A) into a sequential work-group kernel function (FIG. 4B). The changes from work-item function to work-group function are formatted in italic font. These changes can be categorized into three aspects, as elaborated in the following:

1. Transformation for executing all work-items sequentially while preserving synchronization semantics. To execute all work-items, a loop can be wrapped around the work-item to enumerate all work-items. In this example, OpenCL function get_local_size(0) returns the number of work-items in the first dimension, and is used as the loop bound. When there are more dimensions, multiple-level loop nest need to be added.

However, one cannot simply wrap the whole work-item code inside one loop. The reason is that the synchronizations have to be reached by all work-items at the same time. Therefore, the inserted work-item loops are distributed around the synchronizations so that the synchronizations are reached before or after the work-item loops in the sequential program. After the transformation, each work-item loop corresponds to a parallel part in the original work-item kernel function that does not contain synchronization, the transformed version picks an order and executes the parallel part sequentially. In a particular embodiment, the ordering of work-item local IDs is used.

When a synchronization appears inside a loop or a conditional statement, work-item loops need to be distributed around the loop or the conditional statement first, then distributed inside the loop or the conditional statement. As shown in the example, the work-item loop is distributed into three parts: the first part outside the t loop, the second and the third parts inside the t loop. With this distribution, each barrier( ) is met the same number of times in the aggregated sequential work-group kernel as in the original parallel work-item kernel.

2. Transformation for maintaining work-item IDs. OpenCL provides work-item built-in functions that can be used to query work-item IDs, work-group IDs, work-group, only the global IDs and local IDs are different, other IDs and sizes are the same. After aggregation, get_global_id( ) and get_local_id ( ) only returns the IDs for the first work-item in the work-group. For the other work-items, their IDs can be obtained by simply adding in the relative offset to those of the first work-item. Since get_$_{local}$_id ( ) always return 0 for the first work-itme, it is replaced with the work-item loop index variable, WI in the example shown. get_global_id ( ) is replaced with get_global_id ( )+WI. After this transformation, each work-item keeps its original ID.

3. Transfromation for privatizing work-item data. When run in parallel, each work-item has its own thread-private data. After aggregation, thread-private data need to be expanded for each work-item in the work-group. In the example, gid declaration is privatized into gid[numWorkItems] and the reference is rewritten as gid[WI] for each work-item, with WI as the work-item ID. If the kernel is multi-dimensional, the privatization occurs for multiple dimensions as well. In fact, it is possible that some private data do not need to be privatized if their live ranges do not live across the distributed work-item loops.

Figure 5:
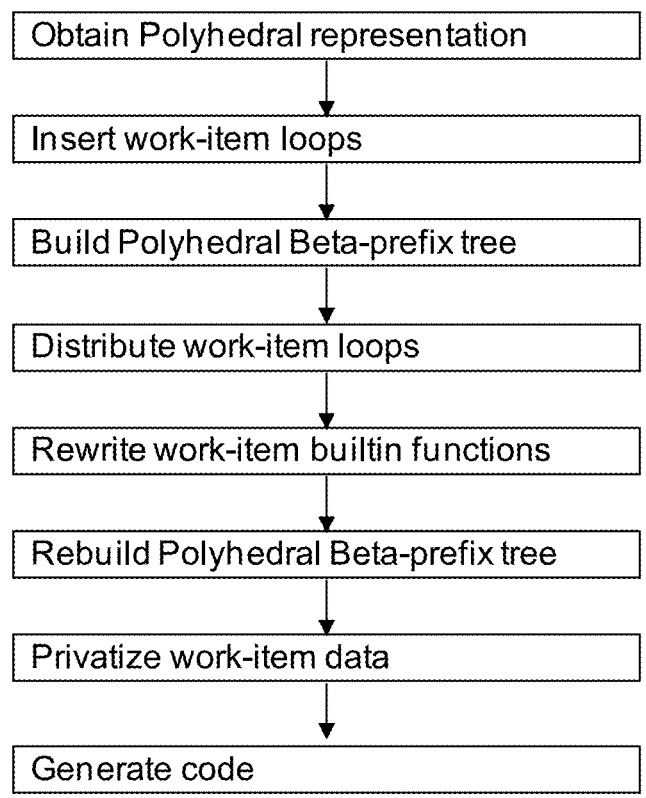
FIG. 5 shows an example overall process of one embodiment of the invention.

FIG. 5 shows an example overall process of one embodiment of the invention. The input to work-aggregation process is an OpenCL kernel function that represents a single work-item, while the output is a function that represents a sequentialized work-group. The input kernel function has been preprocessed such that maximum inlining has been performed and there is only one return statement in the function and the return statement appears at the end. Maximum inlining is possible because OpenCL specification does not allow recursion. With maximum inlining, all synchronizations will appear in the kernel function and not in other functions called by the kernel function. Therefore, distributing loop across synchronizations will only need to consider loop structure and conditional statement structure, not the function calls. With only one return statement, inserted loops can wrap the label before the return statement and not the return statement to simulate finishing some work-items without actually returning from the work-group. The work-group finishes when all work-items have been enumerated.

The example work-item aggregation process takes advantage of a polyhedral framework for necessary transformations since the polyhedral framework provides transformations and analysis that are needed for aggregation. Once the work-item kernel function is extracted into polyhedral representation, the subsequent transformations are applied only to the representation, and at the last step, polyhedral code generation will output an aggregated work-group function from the polyhedral representation. The steps are explained in details as follows, with an example multi-thread source code listing shown in FIG. 6.

Step 1: Obtain Polyhedral Representation.

The work-item kernel function is extracted as one single Static Control Part (SCoP) into Polyhedral framework. In polyhedral representation, each statement in original code corresponds to a Poly statement that contains four matrices. Alpha matrix contains the loop information that the statement is in. Beta matrix is one column matrix for scheduling ordering. Gamma matrix contains symbolic constants of the kernel function. Lambda matrix contains the restrictions of the domain of a statement.

In FIG. 6, statements have been denoted as S0 to S9. Following S0 in the comments is the Beta matrix for S0, as so on. The first thing one can observe about the Beta matrix is that since S0 is executed before S1, the corresponding Beta matrices have a ordering of {0}<{1}. The second thing one can observe is that Beta matrices of S6 to S9 have two entries and their first entries are the same: 6. This indicates that S6 to S9 have a common loop outside of them, within the common loop, S6 is executed before S7 because of the ordering in the corresponding Beta matrices: {6, 0}<{6, 1}. For statements within a loop, their Lambda matrices contain the constraints that represent the loop bounds. For example, for S6, its Lambda matrix has the following two constraints: t>=0 and −t+timeSteps−1>=0.

Step 2: Insert Work-Item loops.

This step applies three polyhedral transformations for each statement.

PT_Extend extends a statement's domain by one more dimension. This is equivalent to adding a new loop around a statement. However, the transformation is only applied to the polyhedral representation, no real loop is added in the code yet. The Alpha, Beta and Lambda matrices are affected after the transformation.

PT_Fusion fuses two statements that each has a loop together into one loop that contains two statements. Of course, the loops being fused have to be compatible. Beta matrices are changed after fusion.

PT_CutDom adds constraints to a statement's domain. This is used to add the loop bounds for loops inserted by PT_Extend. The constraints are added into the Lambda matrix of a statement.

An example algorithm for inserting work-item loops is shown in FIG. 7.

For the example in FIG. 6, the algorithm is only applied to one dimension. The domain of all statements are extended by one new loop, the new loops are then fused into one and constrained into four iterations since the required work group size is (4, 1, 1). The constraints used for cutting the loop bounds are $t1>=0$ and $-t1+3>=0$. The loop bounds could be parameters when the work group size is not fixed.

FIG. 8 shows the result after inserting work-item loops. Note that the code presented here is the code that would be generated by code generation from polyhedral representation. However, this code is not generated. Only the polyhedral representation is changed. After polyhedral transformation step, all statements are wrapped by the work-item loop t1. The Beta matrices for all statements have one more entry compared to those in FIG. 6.

Step 3: Build Polyhedral Beta-Prefix Tree.

Figure 9:
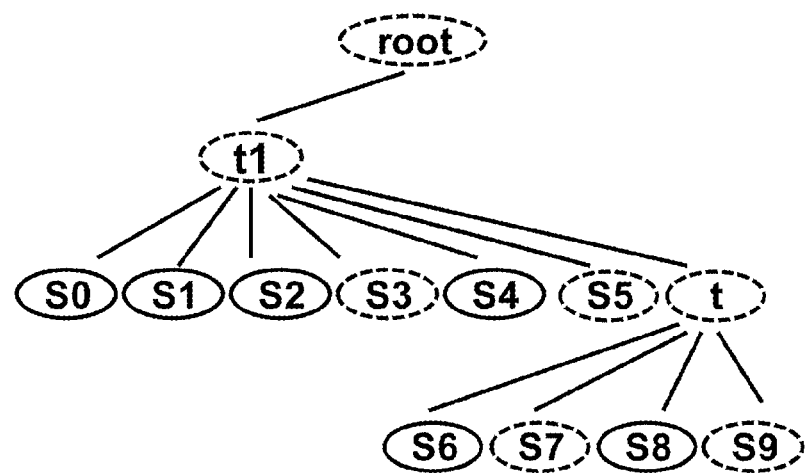
FIG. 9 shows an example beta-prefix tree representations, as contemplated by an embodiment of the present invention.

This step builds a polyhedral Beta-prefix tree, which is a tree built with the Beta matrices. It is a pre-process for the next step. Given the Beta matrices in FIG. 8, the corresponding Beta-prefix tree is shown in FIG. 9. In the tree, all the leaf nodes are the statements and all the internal nodes are the loops (except the root). Two nodes share a common parent if they have common prefix. For example, node S0 and node S8 have common parent node t1 because their matrices have common prefix $\{0\}$.

Once the tree is built, the synchronization nodes and all the internal nodes are identified in the path from root (including the root) to them, indicated by dotted ovals in FIG. 9.

Step 4: Distribute Work-Item Loops.

This step distributes work-item loops around synchronization statements so that synchronizations are only executed before or after work-item loops. The algorithm shown in FIG. 10 traverses the Beta-prefix tree built in the previous step, recursively perform loop interchange and loop distribution, two additional polyhedral transformations are used in this embodiment.

PT_Interchange interchanges a loop with other loops. The Alpha matrix is modified.

PT_Fission distributes a loop around a statement. The Beta matrices of the current statement and the statements after current statement in the same loop are modified.

During the traversal, when a synchronization node or an internal node is visited, loop distribution is applied around this node. If such a node is a leaf node, then the corresponding statement is a synchronization statement and its domain of work-item loops is cut to one iteration. Otherwise, the node is an intermediate node whose corresponding statement is a loop that contains synchronization inside. Loop interchange is then applied to all statements inside this loop to bring the work-item loops inside the current loop. After that, the algorithm recurs on the statements inside the loop. During the traversal, the Beta-prefix tree structure is kept untouched, even though the corresponding polyhedral representation of statements is updated.

Figure 11:
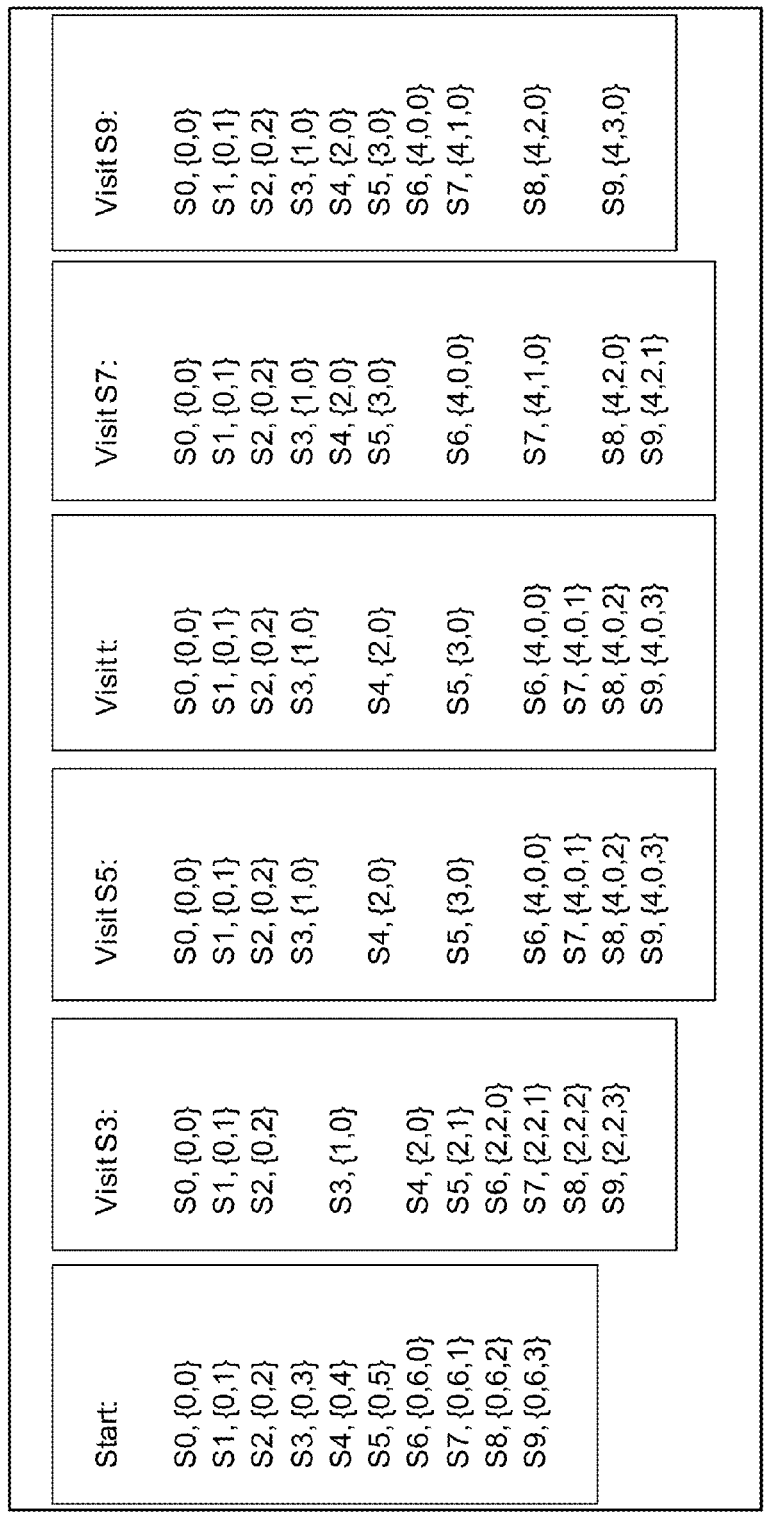
FIG. 11 shows the changes to the beta matrices of all statements after each identified node in the beta-prefix tree of FIG. 9 is visited.

Apply this algorithm on the Beta-prefix tree built in FIG. 9, FIG. 11 shows the changes to the Beta matrices of all statements after each identified node (dotted ovals) is visited. It is again stressed that only the polyhedral representation is changed; there is no real loop interchange or loop distribution occurring on the real code. However, for reference, if one performs polyhedral code generation at this moment, FIG. 12 gives the would-be output. Once this step is done, all synchronization will only appear either before or after the work-item loops but not within any work-item loops. Additionally, the work-item loops are put into the correct places.

Step 5: Rewrite Work-Item Builtin Functions.

This step rewrites the work-item builtin functions so that each work-item still has their original global and local IDs after aggregation. get_local_id(d) is replaced with WI[d], and get_global_id(d) is replaced with get_global_id(d)+WI[d], where WI[d] is the loop index of the work-item loops in the d-th dimension. These changes are applied to the real code of each statement.

Step 6: Rebuild Polyhedral Beta-Prefix Tree

Figure 13:
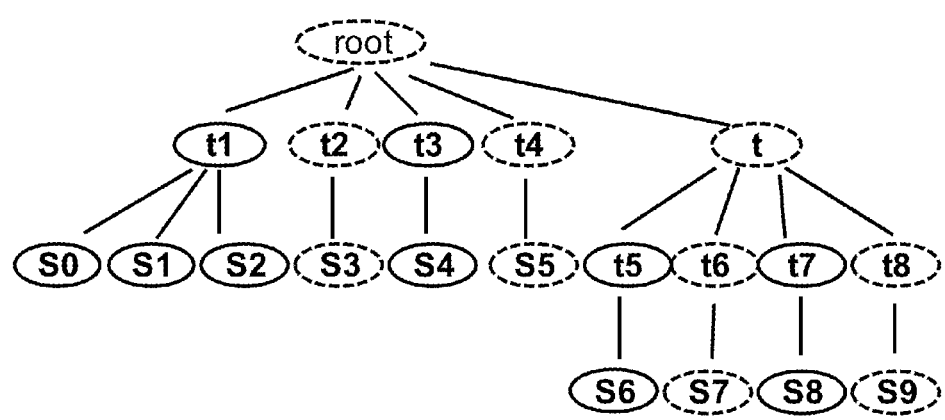
FIG. 13 shows a rebuilt beta-prefix tree for the polyhedral representation after distributing work-item loops around synchronization is performed.

Since Step 4 updates the polyhedral representation, this step rebuilds a Beta-prefix tree for the analysis in the next step. Given the updated beta matrices, FIG. 13 shows the new Beta-prefix tree. Similar to Step 3, all synchronization nodes and all the nodes on the path from root to them are identified as dotted ovals.

Step 7: Privatize Work-Item Data

This step performs privatization analysis and privatization. As mentioned above, a thread-private variable does not need to be privatized if its live range does not step across the work-item loops. With the Beta-prefix tree built in Step 6, it is very easy to determine if a thread-private variable needs to be privatized by finding the lowest common ancestor (LCA) on the tree for all accesses to that private variable. If LCA is a dotted oval node, the variable needs to be privatized, otherwise, there is no need.

Given the example in FIG. 11 and FIG. 12, lid does not need to be privatized because lid is only accessed in $\{S1, S2\}$, LCA(lid)=t1 and t1 is not a dotted oval node, while gid needs to be privatized because gid is accessed in $\{S0, S2, S4, S6, S8\}$, LCA(gid)=root and root is a dotted oval node.

Once all variables need privatization are identified, their declarations are expanded by the dimensions and sizes of the work-item loops, their references are rewritten as references into the multi-dimensional newly expanded storage, indexed by the work-item loop indices. The privatization is performed on the data references in the real code associated with each Polyhedral statement.

Step 8: Generate Code from Polyhedral Representation

Finally, polyhedral code generation is invoked on the transformed polyhedral representation to finalize the work-item aggregation. For the input code in FIG. 6, the final code after work-item aggregation is shown in FIG. 14.

Figure 15:
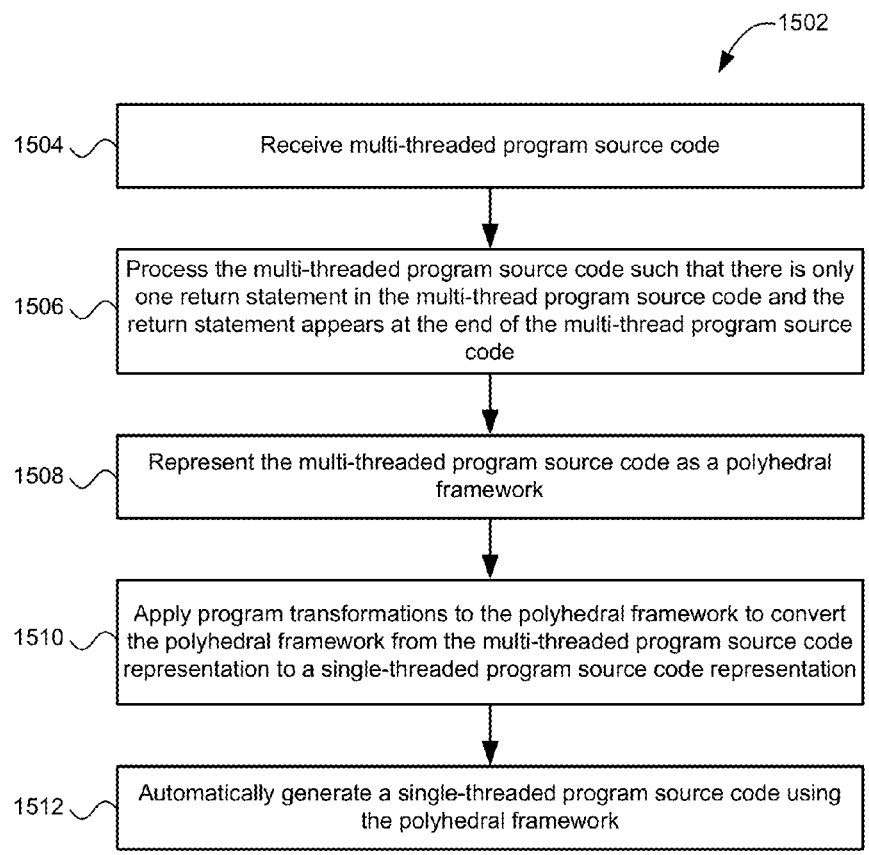
FIG. 15 shows an example process for reducing parallelism of computer source code, as contemplated by the present invention.

Turning now to FIG. 15, a process 1502 for reducing parallelism of computer source code, as contemplated by one embodiment of the invention, is shown.

The process beings with a receiving step 1504 that receives a multi-threaded program source code. As discussed above, the multi-threaded program source code may be a work-item function written in OpenCL syntax. After receiving step 1504 is completed, control passes to processing step 1506.

At processing step 1506, the multi-threaded program source code is processed before applying the program transformations. Specifically, the multi-threaded program source code is written such that there is only one return statement in the multi-threaded program source code and the return statement appears at the end of the multi-threaded program source code. With inlining, all synchronizations will appear in the multi-threaded program source code and not in other functions called by the multi-threaded program source code.

Next, at representing step 1508, the multi-threaded program source code is represented as a polyhedral framework stored in computer readable memory. As discussed above, the polyhedral framework may include an alpha matrix identifying program loops for statements in the multi-threaded program source code, a beta matrix identifying a scheduling order of execution of the statements in the multi-threaded program source code, a gamma matrix containing symbolic constants of the multi-threaded program source code, and a lambda matrix containing domain restrictions of the statements in the multi-threaded program source code. After representing step 1508 is completed, control passes to applying step 1510.

At applying step 1510, program transformations are applied to the polyhedral framework. During this step, the polyhedral framework is converted from the multi-threaded program source code representation to a single-threaded program source code representation. This operation may include wrapping synchronized code blocks of the multi-threaded program source code represented by the polyhedral framework in iterative loops such that the synchronized code blocks are completed in the same number of iterations as the number of threads defined in the multi-threaded program source code.

In one embodiment, applying program transformations to the polyhedral framework includes extending a domain of statements in the polyhedral framework by an additional dimension, fusing at least two statements in the multi-threaded program source code into a single program loop that contains the fused statements, and indicating constraints to the fused statement's domain in bounds of the single program loop. In another embodiment, applying program transformations to the polyhedral framework includes distributing program loops in the polyhedral framework around synchronization statements in the multi-threaded program source code so that the synchronization statements are only executed before and after the program loops. In a further embodiment, applying program transformations includes extracting the multi-threaded program source code into the polyhedral framework, performing the program transformations only to the polyhedral representation, and outputting the sequential code from the polyhedral framework. In another embodiment, a beta-prefix tree data structure of the polyhedral framework is generated, wherein leaf nodes of the beta-prefix tree are statements in the polyhedral framework and internal nodes of the beta-prefix tree are the loops in the polyhedral framework.

Once applying operation 1510 is completed, control passes to generating operation 1512. During the generating operation 1512, a single-threaded program source code using the polyhedral framework is automatically generated. In one embodiment, the single-threaded program source code is a work-group function written in OpenCL syntax.

As will be appreciated by one skilled in the art, aspects of the invention may be embodied as a system, method or computer program product. Accordingly, aspects of the invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the C programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the preferred embodiments to the invention has been described, it will be understood that those skilled in the art, both now and in the future, may make various improvements and enhancements which fall within the scope of the claims which follow. Thus, the claims should be construed to maintain the proper protection for the invention first described. OpenCL is a trademark of Apple Inc., and is used under license by Khronos.

What is claimed is:

1. A method for reducing parallelism of computer source code, the method comprising:
   receiving multi-threaded program source code;
   representing the multi-threaded program source code as a polyhedral framework stored in computer readable memory;
   applying transformations to the polyhedral framework using a computer processor to convert the polyhedral framework from the multi-threaded program source code representation to a single-threaded program source code representation; and
   automatically generating a single-threaded program source code using the polyhedral framework, wherein the polyhedral framework includes:
      an alpha matrix identifying program loops for statements in the multi-threaded program source code;
      a beta matrix identifying a scheduling order of execution of the statements in the multi-threaded program source code;
      a gamma matrix containing symbolic constants of the multi-threaded program source code; and
      a lambda matrix containing domain restrictions of the statements in the multi-threaded program source code.

2. The method of claim 1, further comprising wrapping synchronized code blocks of the multi-threaded program source code represented by the polyhedral framework in iterative loops such that the synchronized code blocks are completed in the same number of iterations as the number of threads defined in the multi-threaded program source code.

3. The method of claim 1, further comprising processing the multi-threaded program source code before applying the program transformations such that there is only one return statement in the multi-threaded program source code and the return statement appears at the end of the multi-threaded program source code.

4. The method of claim 1, wherein applying program transformations to the polyhedral framework includes:
   extending a domain of statements in the polyhedral framework by an additional dimension;
   fusing at least two statements in the multi-threaded program source code into a single program loop that contains the fused statements; and
   indicating constraints to the fused statement's domain in bounds of the single program loop.

5. The method of claim 1, wherein applying program transformations to the polyhedral framework includes generating a beta-prefix tree data structure of the polyhedral framework, wherein leaf nodes of the beta-prefix tree are statements in the polyhedral framework and internal nodes of the beta-prefix tree are the loops in the polyhedral framework.

6. The method of claim 1, wherein applying program transformations to the polyhedral framework includes distributing program loops in the polyhedral framework around synchronization statements in the multi-threaded program source code so that the synchronization statements are only executed one of before and after the program loops.

7. The method of claim 1, further comprising:
   wherein the multi-threaded program source code is a work-item function is in OpenCL syntax; and
   wherein the single-threaded program source code is a work-group function is in OpenCL syntax.

8. The method of claim 1, wherein program transformations to the computer source code includes:
   extracting the multi-threaded program source code into the polyhedral framework;
   performing the program transformations only to the polyhedral representation; and
   outputting the sequential code from the polyhedral framework.

9. A system for reducing parallelism of computer source code, the system comprising:
   computer readable memory;
   multi-threaded program source code stored in the computer readable memory;
   a computer processor coupled to the computer readable memory, the computer processor configured to:
   represent the multi-threaded program source code as a polyhedral framework stored in the computer readable memory;
   apply transformations to the polyhedral framework to convert the polyhedral framework from the multi-threaded program source code representation to a single-threaded program source code representation; and
   automatically generate a single-threaded program source code using the polyhedral framework, wherein the polyhedral framework includes:

an alpha matrix identifying program loops for statements in the multi-threaded program source code;
a beta matrix identifying a scheduling order of execution of the statements in the multi-threaded program source code;
a gamma matrix containing symbolic constants of the multi-threaded program source code; and
a lambda matrix containing domain restrictions of the statements in the multi-threaded program source code.

10. The system of claim 9, wherein the computer processor is further configured to wrap synchronized code blocks of the multi-threaded program source code represented by the polyhedral framework in iterative loops such that the synchronized code blocks are completed in the same number of iterations as the number of threads defined in the multi-threaded program source code.

11. The system of claim 9, wherein the computer processor is further configured to process the multi-threaded program source code before applying the program transformations such that there is only one return statement in the multi-threaded program source code and the return statement appears at the end of the multi-threaded program source code.

12. The system of claim 9, wherein the computer processor, in applying program transformations to the polyhedral framework, is further configured to:
extend a domain of statements in the polyhedral framework by an additional dimension;
fuse at least two statements in the multi-threaded program source code into a single program loop that contains the fused statements;
indicate constraints to the fused statement's domain in bounds of the single program loop.

13. The system of claim 9, wherein the computer processor, in applying program transformations to the polyhedral framework, is further configured to generate a beta-prefix tree data structure of the polyhedral framework, wherein leaf nodes of the beta-prefix tree are statements in the polyhedral framework and internal nodes of the beta-prefix tree are the loops in the polyhedral framework.

14. The system of claim 9, wherein the computer processor, in applying program transformations to the polyhedral framework, is further configured to distribute program loops in the polyhedral framework around synchronization statements in the multi-threaded program source code so that the synchronization statements are only executed one of before and after the program loops.

15. The system of claim 9, further comprising:
wherein the multi-threaded program source code is a work-item function is in OpenCL syntax; and
wherein the single-threaded program source code is a work-group function is in OpenCL syntax.

16. A computer program product for reducing parallelism of computer source code, the computer program product comprising:
a computer readable storage memory having computer readable program code embodied therewith, the computer readable program code configured to:
receive multi-threaded program source code;
represent the multi-threaded program source code as a polyhedral framework stored in computer readable memory;
apply transformations to the polyhedral framework using a computer processor to convert the polyhedral framework from the multi-threaded program source code representation to a single-threaded program source code representation; and
automatically generate a single-threaded program source code using the polyhedral framework, wherein the polyhedral framework includes:
an alpha matrix identifying program loops for statements in the multi-threaded program source code;
a beta matrix identifying a scheduling order of execution of the statements in the multi-threaded program source code;
a gamma matrix containing symbolic constants of the multi-threaded program source code; and
a lambda matrix containing domain restrictions of the statements in the multi-threaded program source code.

17. The computer program product of claim 16, further comprising computer readable program code to wrap synchronized code blocks of the multi-threaded program source code represented by the polyhedral framework in iterative loops such that the synchronized code blocks are completed in the same number of iterations as the number of threads defined in the multi-threaded program source code.

18. The computer program product of claim 16, further comprising computer readable program code to process the multi-threaded program source code before applying the program transformations such that there is only one return statement in the multi-threaded program source code and the return statement appears at the end of the multi-threaded program source code.

19. The computer program product of claim 16, wherein the computer readable program code to apply the program transformations to the polyhedral framework includes computer readable program code to:
extend a domain of statements in the polyhedral framework by an additional dimension;
fuse at least two statements in the multi-threaded program source code into a single program loop that contains the fused statements;
indicate constraints to the fused statement's domain in bounds of the single program loop.

20. The computer program product of claim 16, wherein the computer readable program code to apply the program transformations to the polyhedral framework includes computer readable program code to generate a beta-prefix tree data structure of the polyhedral framework, wherein leaf nodes of the beta-prefix tree are statements in the polyhedral framework and internal nodes of the beta-prefix tree are the loops in the polyhedral framework.

21. The computer program product of claim 16, wherein the computer readable program code to apply the program transformations to the polyhedral framework includes computer readable program code to distribute program loops in the polyhedral framework around synchronization statements in the multi-threaded program source code so that the synchronization statements are only executed one of before and after the program loops.

* * * * *